Jan. 3, 1967        E. H. BACON        3,295,887
CARRIER FOR USE WITH VEHICLE SEATS
Filed June 29, 1965
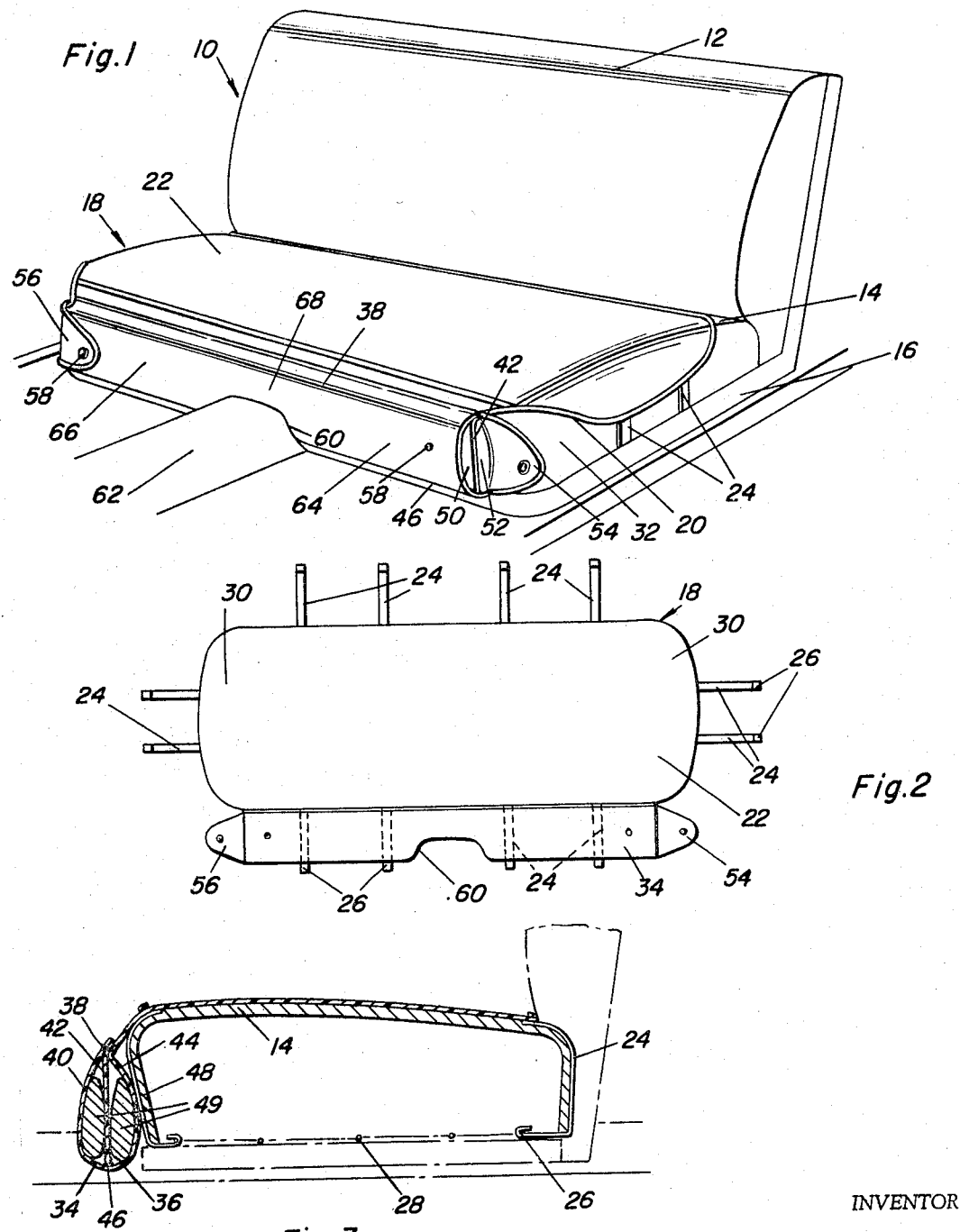
INVENTOR
Eldrid H. Bacon
BY Stevens, Davis, Miller & Mosher
ATTORNEYS

United States Patent Office 3,295,887
Patented Jan. 3, 1967

3,295,887
CARRIER FOR USE WITH VEHICLE SEATS
Eldrid H. Bacon, Box 177, Three Forks, Mont. 59752
Filed June 29, 1965, Ser. No. 467,905
6 Claims. (Cl. 297—188)

This invention relates to carriers for elongated articles adapted for use with vehicle seats and more particularly to a carrier secured to a vehicle seat that has an out-of-the-way compartment which provides a safe and convenient way to carry elongated articles in a vehicle.

As recognized by anyone experienced in traveling in a vehicle, there is a need for a carrier or carrying device which will carry elongated articles in a position out of the way of the occupants in the vehicle and yet facilitate easy loading and unloading of the articles without disturbing the occupants. Although a number of attempts have been made to produce such carrying devices, these have often met with failure due to installation difficulties, lack of adequate protection for the articles being carried, and more particularly, the lack of accessibility of such devices. Advantageously, in accordance with this invention I have provided a carrier or carrying device for a variety of elongated articles, e.g., fishing rods, rifles, shotguns, umbrellas, rolled newspapers, canes, and the like, which suspends the articles in a position that is out of the way of the occupants and also that is readily accessible for loading and unloading of the articles.

This invention contemplates a carrier for elongated articles adapted for use with vehicle seats which comprises one or more envelope or sheath-like compartments that have at least one open end through which elongated articles can be inserted into and removed from the compartment and means for protectively covering at least the seat portion of a vehicle seat and for suspending the compartment and its contents below the level of the covered seat portion in an out-of-the-way position accessible from the sides of the vehicle seat.

The carrier of this invention may be briefly described as including flexible cover means adapted to overlie and protectively extend across a substantial portion of the front surfaces of a vehicle seat, one or more envelope or sheath-like compartments secured along one edge of the cover means for carrying elongated articles in an out-of-the-way position accessible from the sides of the vehicle seat and fastening means such as a plurality of elastic straps for resiliently securing the cover means to the frame of the vehicle seat.

The flexible cover means consists of one or more panels which are of sufficient size to cover the width and length of the seat and/or back portions of a vehicle seat. Advantageously, the panel adapted to cover the seat portion has end extensions or wings which extend over the sides of the seat portion and which are held down by the fastening means to permit a person to slide onto the panel seat covering portion without disarranging the relative position of the carrier on the vehicle seat.

Each envelope or sheath-like compartment secured to the cover means is advantageously suspended along that edge of the cover means which is adapted to extend over the front of the seat portion of the vehicle seat. In this arrangement, the compartment is permitted to hang from the cover means so that articles placed therein are held or gripped by the sides of the compartment in an out-of-the-way position adjacent to the lower portion of the vehicle seat and thus prevented from being accidently displaced therefrom. Preferably, means are also provided for closing of the ends of the compartment to substantially exclude dirt and dust from the compartment and thereby additionally protect the articles therein.

Advantageously, the envelope-like compartment is provided midway of its length with a semi-circular or similarly shaped indentation or cut-out portion to allow for the hump in the floor boards of most passenger-type vehicles. It will be appreciated that the indentation acts to divide the lower portion of the compartment so that elongated articles of relatively short length are prevented from sliding through the compartment by any sudden movement of the vehicle.

Other objects and advantages of my invention will be apparent from attention to the attached drawings and detailed description of a preferred embodiment, which embodiment is merely illustrative of my inventive concepts, and in which:

FIGURE 1 is a view in perspective of my carrier for elongated articles in place on a vehicle seat, FIGURE 2 is a plan view of my carrier opened out flat, and FIGURE 3 is a sectional side view in elevation of a vehicle seat having my carrier installed thereon, and showing elongated articles being held in stowage by my carrier.

Referring to the drawings in FIGURE 1, a vehicle seat is shown generally at 10 and includes a substantially vertical back portion 12 and horizontal seat portion or cushion 14 supported on seat frame 16. The carrier of this invention, generally designated by reference numeral 18, is shown in place covering the horizontal seat portion of the vehicle seat. The carrier is fabricated from suitable flexible sheet material and has reinforced seams 20 along its outer edges and elsewhere as necessary for strength and long life. Suitable materials which may be used for my carrier include flexible plastic sheets or cloth sheets of natural or synthetic fibers or laminates thereof and may comprise woven or non-woven materials.

The carrier has a seat cover portion which includes panel 22 adapted to overlie and neatly cover the horizontal seat portion or cushions of the seat as shown. The cover panel is held firmly in place on the seat portion of the vehicle seat by elastic straps 24 which are spaced along the sides and ends of the panel (see FIGURE 2). Each strap has a hook 26 attached to its free end so that it can be releasably secured to the seat springs as shown at 28. The hooks can, if desired, be hooked to other under portions of the seat frame or other fastening devices can be employed to secure the straps to parts of the automobile structure underlying the seat or seat frame.

The cover panel has extensions or panel wings 30 at each of its side ends and these wings are adapted to extend down over the end faces or surfaces 32 of the seat portion, and are held down in place by the elastic straps 24 (as best seen in FIGURE 1).

It will be appreciated that with the cover panel of the carrier in place on a seat cushion, a person (not shown) in sliding onto the carrier is prevented from catching and displacing the ends 30 of the cover panel. In this manner the relative position of the carrier on the seat is maintained during continuous use.

The cover panel of the carrier suports two envelope-like compartments 34 and 36 which are attached by reinforced seam 38 to the front edge of the panel. The compartments as shown in FIGURES 1 and 3 are formed of three elongated flexible panel members 40, 42, and 44, secured together along their lengths by reinforced seams 38 and 46. It will be understood, however, that only one compartment may be provided by omitting one of the panel members. Also one or more compartments may be formed by separate single sheets of material folded along their lengths so that there are double layers or panel members between each individual compartment.

When the carrier is in place on the vehicle seat, the reinforced seam 38 extends in a line just forward and just below the level of the upper face or surface of the seat portion of the vehicle seat. In this arrangement envelope-like compartments 34 and 36 are freely suspended by the reinforced seam 38 so that the weight of an article placed in either or both the compartments will pull downwardly and cause the compartments to swing in toward the front vertical panel 48 of the vehicle seat. This swinging action places the compartments in an out-of-the-way position closely adjacent to the lower portion of front panel on the vehicle seat. Furthermore, the weight of the article in the compartment causes the side of panel members to grip or hold the articles securely in place. As shown in FIGURE 3 rifles 49 are snugly held in each of the compartments by the three panel members. It will be appreciated that the weight of the articles in one or both of the envelope-like compartments tend to pull the cover panel so that it is tautly held over the seat portion of the vehicle seat. Advantageously, the resiliency of the elastic straps 24 allows the cover panel to move and conform to the weight of an occupent on the seat so that the envelope-like compartments are maintained in their out-of-the-way position.

Each of the compartments are provided with an access opening at one end and preferably have another access opening at the opposite end so that articles can be inserted into and removed from the interior of each compartment from both sides of the vehicle seat. As shown in FIGURE 1, access openings 50 and 52 of each of the compartments are freely accessible from the sides of the vehicle seat.

Closure flaps 54 and 56 are also provided for covering both of the access openings of each compartment. Snaps 58 or other types of fasteners are provided on outer panel member 40 for detachably securing the flaps in a closed position. Suitable means for fastening or securing the flaps in closed position include buttons, zippers, buckles, hooks, and the like. It will be appreciated that the closure flaps may be formed as an integral portion of panel 44 or may be separately attached thereto.

The envelope-like compartments 34 and 36 are each provided in the central lower portion with a semi-circular indentation or cut-out area 60 to allow for the floor rise or hump 62 which is conventionally present in the floor board of most passenger vehicles. Advantageously, the indentation also serves to partially divide each of the envelope-like compartments into two shorter article-supporting zones 64 and 66. Because the weight of an article causes it to occupy the lower part of the compartment, the indentation prevents elongated articles of relatively short lengths from sliding the length of each compartment as might occur, for example, if the vehicle were to make a sudden swerve or turn.

Furthermore, it will be appreciated that the indentation also provides a stop means or positioning guide so that elongated articles such as rifles, shotguns and the like having relatively wider portion at one end may be slid into the compartment and allowed to abut the reinforced seams which outline the indentation. A space or passage 68 provided above the indentation in each of the compartments will be suitably wide to allow an elongated article such as a rifle inserted at one end of the compartment to be removed from the other end without and difficulty.

As exemplary of the storage of elongated articles by the carrier, a gunstock or a reel attached to a section of a fishing rod can be neatly and securely cradled in either one of the article-supporting zones of the compartments with the barrel or rod, respectively, extended through the narrower space or passage 68 so as to be supported upon the reinforced seam of the indentation.

It will now be understood that the carrier of this invention allows for a rapid and easy access to articles carried by it from either side of the vehicle and that such articles can be loaded and unloaded into the compartments of the carrier through the access openings in the ends without disturbing occupants sitting on the seat of the vehicle. Each envelope-like compartment is out of the way beneath the legs of persons sitting on the seat, and thus provides a particularly safe and convenient way to carry rifles, shotguns and the like. The closure flaps ordinarily cover the access openings during use and articles within the compartments are thus not dirtied by road dust and the like.

It will be appreciated that some movement up and down of the envelope-like compartment is provided for by resilient stretch or give of the straps, and by movement and resiliency of the cover panel particularly at areas where the carrier is not pressed against the cushion by an occupant. Since each compartment is suspended above the floor of the vehicle, articles carried within the compartment are resiliently supported so that there is less chance of damage to them from hazards of bouncing and road shock. It is also to be appreciated that the envelope-like compartments can be flipped up onto the seat portion of the seat and supported horizontally for convenience in loading and unloading articles into or from the carrier. The compartments can then be turned back down over the forward edge of the cover panel so that each hangs along the front face of the seat out of the way of persons sitting on the seat.

In a further embodiment of the invention, not shown, my carrier can be provided with a panel of suitable flexible material which will extend from the cover panel up over the seat back and cover it in a known manner similar to a full seat cover.

It will be understood by those skilled in the art that various changes and modifications can be made in size, shape and in arrangement of parts without departing from the spirit and scope of the invention as defined by the appended claims.

I claim:

1. A carrier for elongated articles adapted for use on a vehicle seat which comprises a flexible cover means adapted to extend over at least the seat portion of said vehicle seat, fastening means for securing said cover means to said vehicle seat, and at least one envelope-like compartment attached along the length of said cover means below the level of the covered seat portion, said compartment having an indentation in its central lower portion which is shaped to fit over a hump in the floor boards of a vehicle, and said compartment also having at least one open end whereby elongated articles may be inserted into and removed from said compartment from the sides of said vehicle seat.

2. A carrier for elongated articles adapted for use on a vehicle seat which comprises a flexible cover panel of sufficient length and width to cover at least the seat portion of said vehicle seat, a plurality of elastic straps attached to said cover panel and secured to said vehicle seat, and a plurality of envelope-like compartments suspended from the cover panel below the level of the seat portion of said vehicle seat whereby said compartments will swing toward said vehicle seat when loaded with an elongated article, said compartments each having at least one open end whereby elongated articles may be inserted into and removed from said compartments from the sides of said vehicle seat and said cover panel having extensions at each of its ends adapted to extend over the opposite sides of the seat portion of the vehicle seat whereby disarrangement of the carrier is prevented when a person slides onto the cover panel.

3. The carrier of claim 2 in which the sole attachment between said cover means and said compartment is a reinforced seam extending as a line in front of and below the level of the seat portion of said vehicle seat whereby said compartment can be moved away from the front of said seat and flipped over onto the seat portion to facilitate loading of elongated articles into said open end.

4. A carrier for elongated articles adapted for use on a vehicle seat which comprises a flexible cover means adapted to extend over at least the seat portion of said vehicle seat, fastening means for securing said cover means to said vehicle seat, and at least one envelope-like compartment solely attached along its uppermost portion to the length of said cover means in front of and below the level of the covered seat portion whereby said compartment is freely suspended from said cover means along the front of said vehicle seat, said compartment having at least one open end whereby elongated articles may be inserted into and removed from said compartment from the sides of said vehicle seat.

5. A carrier for elongated articles adapted for use on a vehicle seat which comprises a flexible cover panel having sufficient length and width to cover at least the seat portion of said vehicle seat, a plurality of elastic straps attached to said cover panel and secured to said vehicle seat, and a plurality of envelope-like compartments formed from at least two elongated side panel members secured together along their upper edges and suspended from the cover panel below the level of the seat portion of said vehicle seat, said compartments being solely suspended along their upper edges from said cover panel and each having at least one open end whereby elongated articles may be inesrted into and removed from said compartments from the sides of said vehicle seat.

6. The carrier of claim 4 in which said compartment has means for closing its open end and whereby an elongated article placed within said compartment is protected from dust, dirt and the like.

References Cited by the Examiner

UNITED STATES PATENTS

| | | | |
|---|---|---|---|
| 1,195,394 | 8/1916 | Panet | 5—343 |
| 1,841,410 | 1/1932 | Karr | 297—224 X |
| 2,455,296 | 11/1948 | Current | 150—52 X |
| 2,740,466 | 4/1956 | Du Priest | 297—188 X |
| 3,014,759 | 12/1961 | Bing | 297—191 |
| 3,151,909 | 10/1964 | Gerdetz | 297—188 |

FOREIGN PATENTS 1,142,015  3/1957  France.

FRANK B. SHERRY, *Primary Examiner.*

JAMES T. McCALL, *Assistant Examiner.*